United States Patent
Kim et al.

(10) Patent No.: US 12,034,156 B2
(45) Date of Patent: Jul. 9, 2024

(54) SULFUR-CARBON COMPOSITE, PREPARATION METHOD THEREFOR, AND LITHIUM SECONDARY BATTERY COMPRISING SAME

(71) Applicant: LG ENERGY SOLUTION, LTD., Seoul (KR)

(72) Inventors: Eui Tae Kim, Daejeon (KR); Suenghoon Han, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/298,720

(22) Filed: Apr. 11, 2023

(65) Prior Publication Data
US 2024/0021803 A1     Jan. 18, 2024

Related U.S. Application Data

(63) Continuation of application No. 16/646,490, filed as application No. PCT/KR2018/014070 on Nov. 16, 2018, now Pat. No. 11,658,293.

(30) Foreign Application Priority Data

Nov. 16, 2017  (KR) .................. 10-2017-0153249
Feb. 23, 2018  (KR) .................. 10-2018-0022217
Nov. 15, 2018  (KR) .................. 10-2018-0140659

(51) Int. Cl.
*H01M 4/38*     (2006.01)
*H01M 4/36*     (2006.01)
(Continued)

(52) U.S. Cl.
CPC ............. *H01M 4/38* (2013.01); *H01M 4/362* (2013.01); *H01M 4/583* (2013.01);
(Continued)

(58) Field of Classification Search
CPC ........ H01M 4/38; H01M 4/362; H01M 4/583; H01M 10/0525
See application file for complete search history.

(56) References Cited

U.S. PATENT DOCUMENTS

| 2011/0052998 A1 | 3/2011 | Liang et al. |
| 2013/0022529 A1 | 1/2013 | Lee et al. |

(Continued)

FOREIGN PATENT DOCUMENTS

| CN | 103094535 A | 5/2013 |
| CN | 103660232 A | 2/2014 |

(Continued)

OTHER PUBLICATIONS

Extended European Search Report for European Application No. 18877799.9, dated Nov. 4, 2020.
(Continued)

*Primary Examiner* — Nathanael T Zemui
(74) *Attorney, Agent, or Firm* — Birch, Stewart, Kolasch & Birch, LLP

(57) ABSTRACT

A sulfur-carbon composite including a porous carbon material; and sulfur coated on at least a portion of an inside and a surface of the porous carbon material, wherein a pore volume of the sulfur-carbon composite is 0.04 to 0.400 cm³/g and a specific surface area of the sulfur-carbon composite is 4.0 to 30 m²/g, and a method for preparing the same.

9 Claims, 8 Drawing Sheets

(51) Int. Cl.
   *H01M 4/583*   (2010.01)
   *H01M 10/0525* (2010.01)
   *H01M 4/02*    (2006.01)
   *H01M 4/62*    (2006.01)

(52) U.S. Cl.
   CPC .. *H01M 10/0525* (2013.01); *H01M 2004/028* (2013.01); *H01M 4/623* (2013.01)

(56) References Cited

U.S. PATENT DOCUMENTS

| | | | |
|---|---|---|---|
| 2013/0164626 | A1 | 6/2013 | Manthiram et al. |
| 2016/0240841 | A1 | 8/2016 | He et al. |
| 2017/0179477 | A1 | 6/2017 | Walters et al. |
| 2017/0222227 | A1 | 8/2017 | Lux et al. |
| 2017/0309949 | A1 | 10/2017 | Jung et al. |
| 2018/0331352 | A1* | 11/2018 | Morales Palomino ............ H01M 4/1393 |
| 2019/0044138 | A1* | 2/2019 | Zhamu ............ H01M 10/054 |

FOREIGN PATENT DOCUMENTS

| | | |
|---|---|---|
| CN | 104022267 A | 9/2014 |
| CN | 105514395 A | 4/2016 |
| CN | 106876699 A | 6/2017 |
| KR | 10-2010-0136974 A | 12/2010 |
| KR | 10-2013-0011157 A | 1/2013 |
| KR | 10-2014-0107583 A | 9/2014 |
| KR | 10-2015-0043407 A | 4/2015 |
| KR | 10-2016-0037084 A | 4/2016 |
| KR | 10-2016-0061033 A | 5/2016 |
| KR | 10-1820867 B1 | 3/2018 |
| WO | WO 2009/114314 A2 | 9/2009 |
| WO | WO 2017/081182 A1 | 5/2017 |
| WO | WO 2017/143549 A1 | 8/2017 |

OTHER PUBLICATIONS

International Search Report for PCT/KR2018/014070 mailed on Feb. 22, 2019.

Ji et al., "Porous carbon nanofiber-sulfur composite electrodes for lithium/sulfur cells," Energy & Environmental Science, vol. 4, 2011, pp. 5053-5059.

Tan et al., "Acetylene Black/Sulfur Composites Synthesized by a Solution Evaporation Concentration Crystallization Method and Their Electrochemical Properties for Li/S Batteries", Energies, vol. 6, No. 7, Jul. 1, 2013, pp. 3466-3480.

Zheng et al., "Revisit Carbon/Sulfur Composite for Li-S Batteries," Journal of the Electrochemical Society, vol. 160, No. 10, 2013, pp. A1624-A1628.

Zhu et al., "Microwave assisted preparation of expanded graphite/sulfur composites as cathodes for Li-S batteries", New Carbon Materials, vol. 31, No. 2, May 1, 2016, pp. 199-204.

* cited by examiner

[Figure 1]
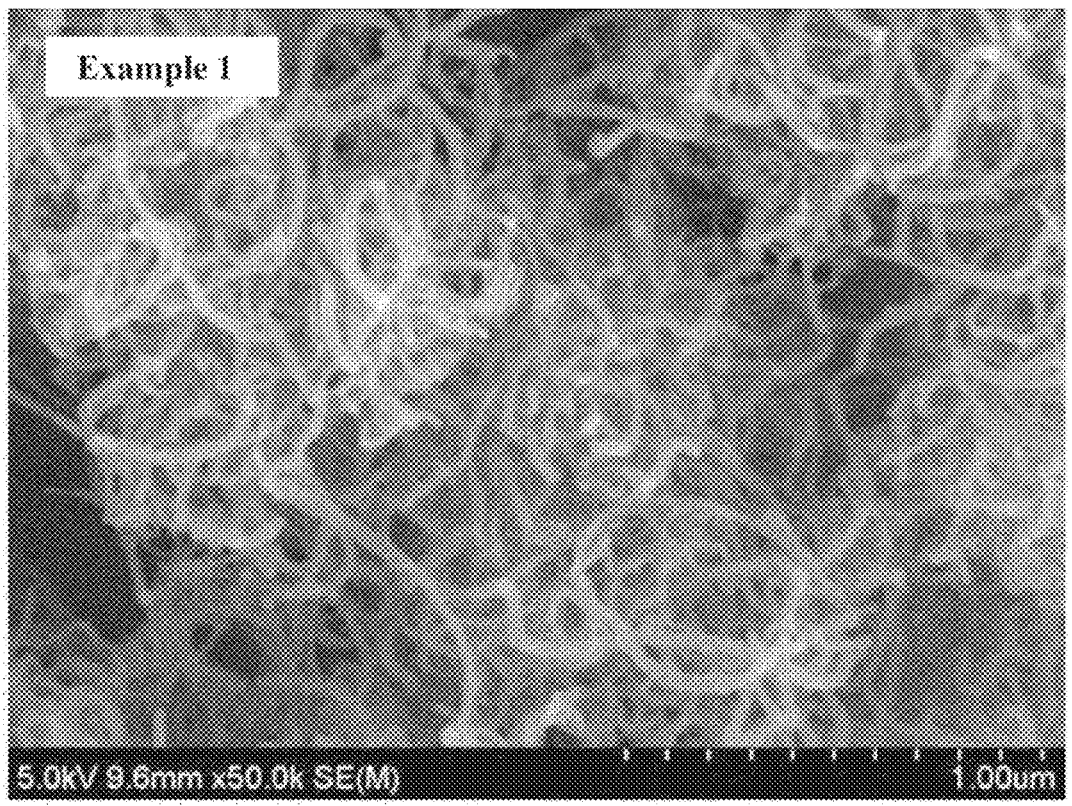
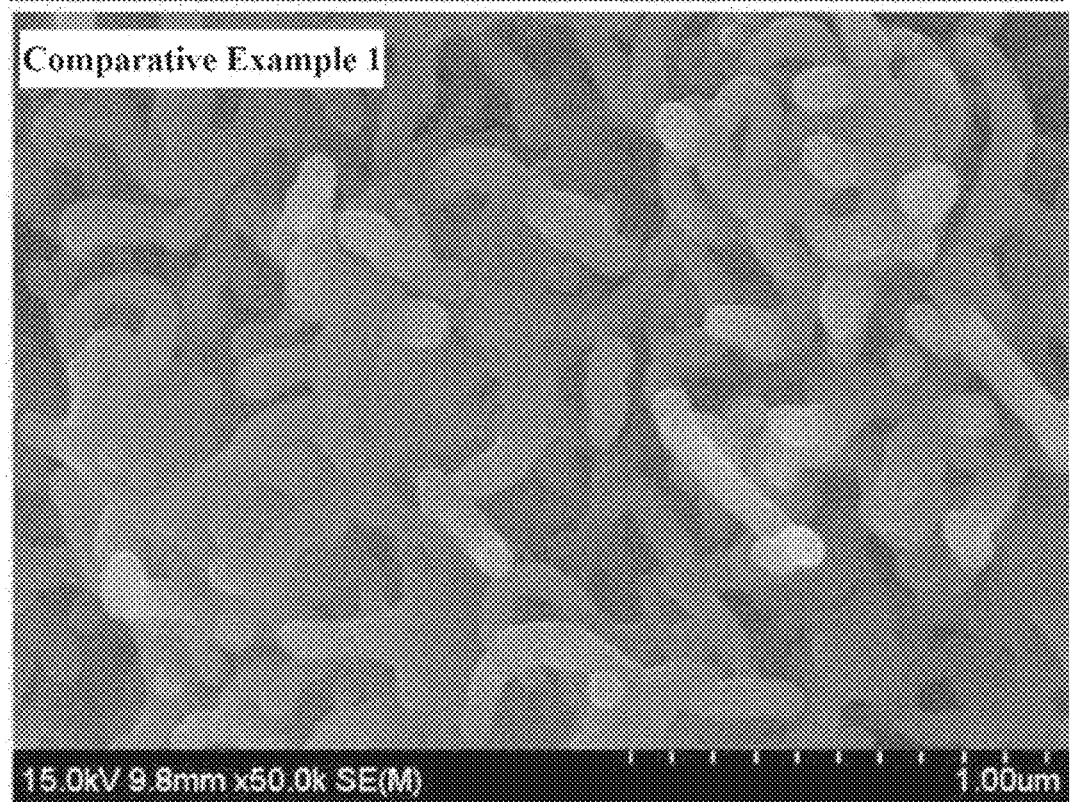

[Figure 2]
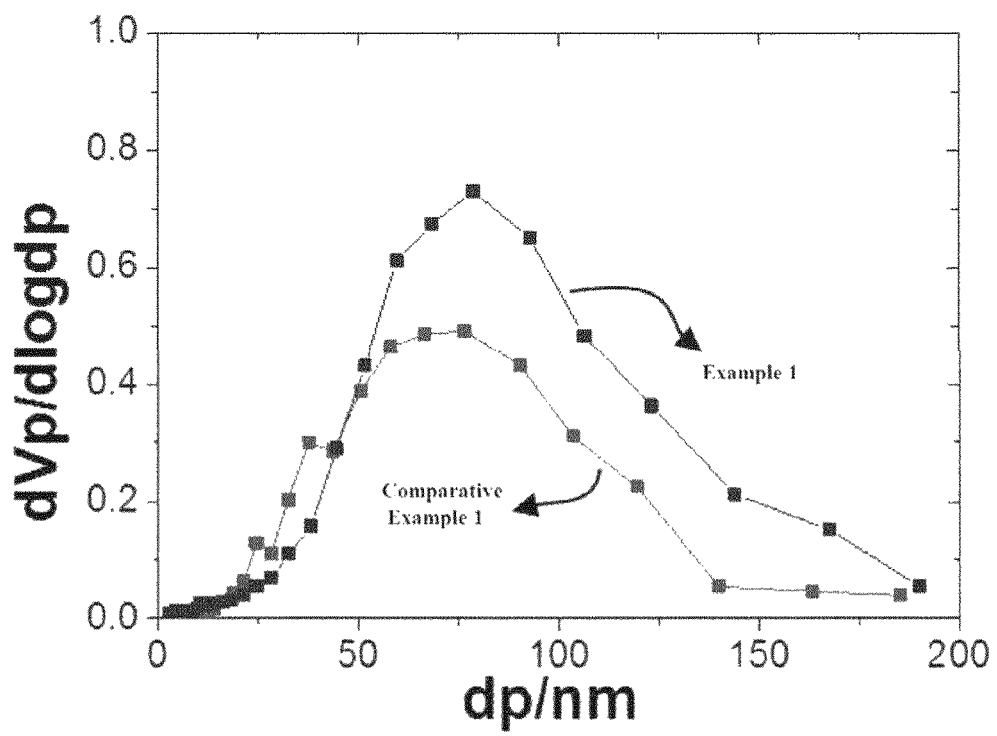

[Figure 3]
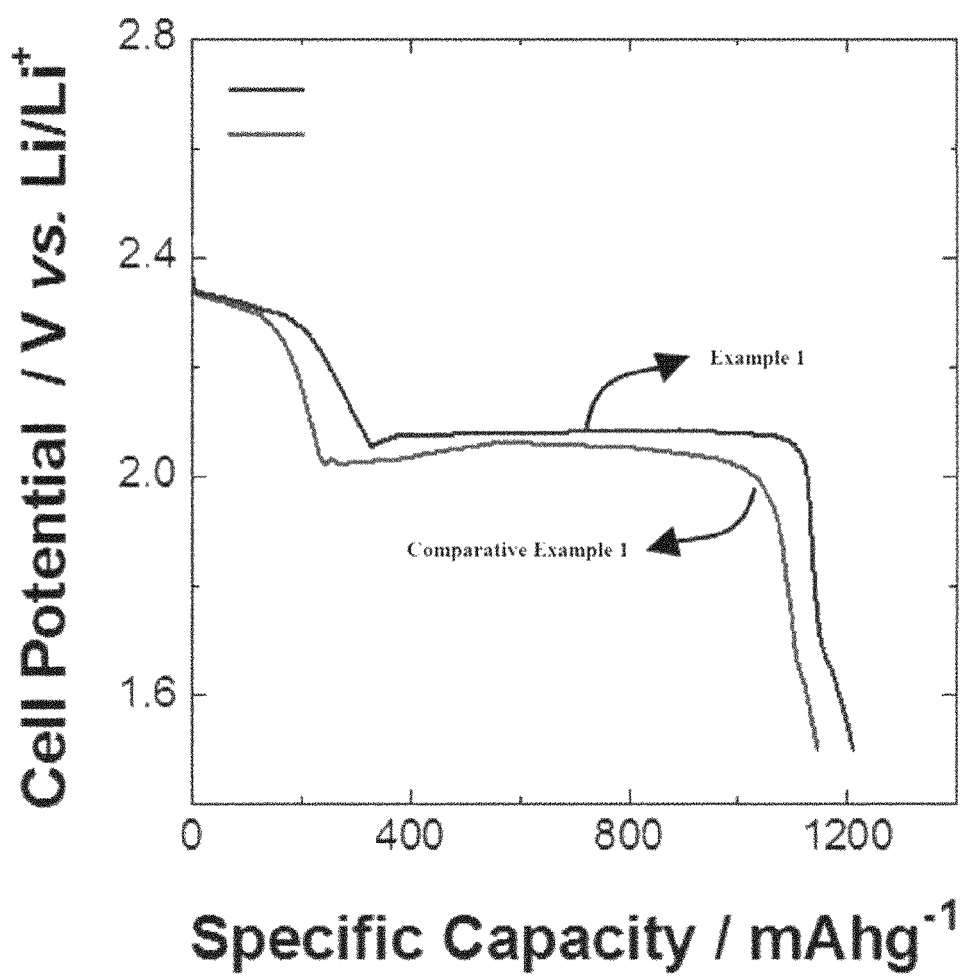

【Figure 4】
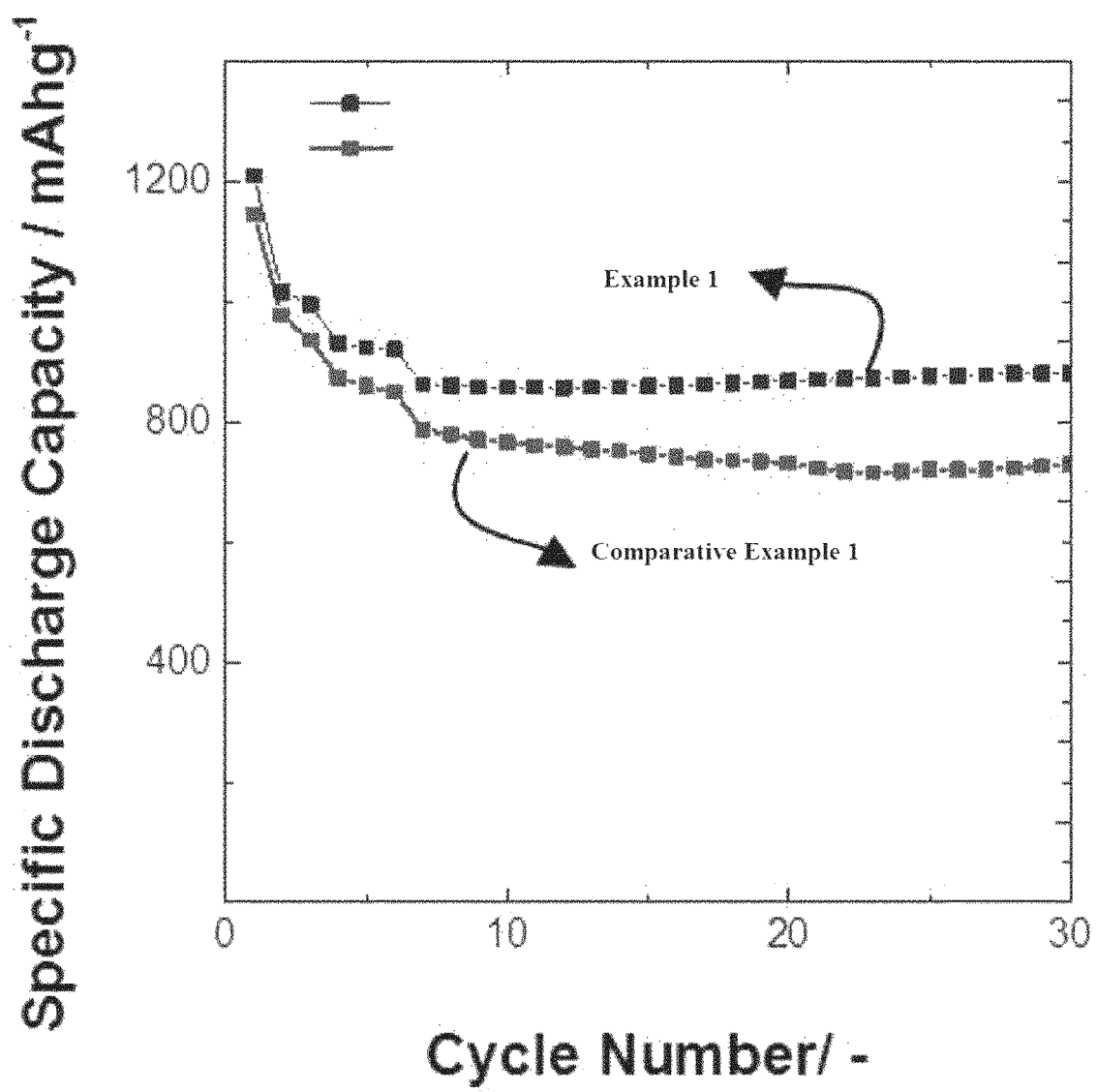

[Figure 5]
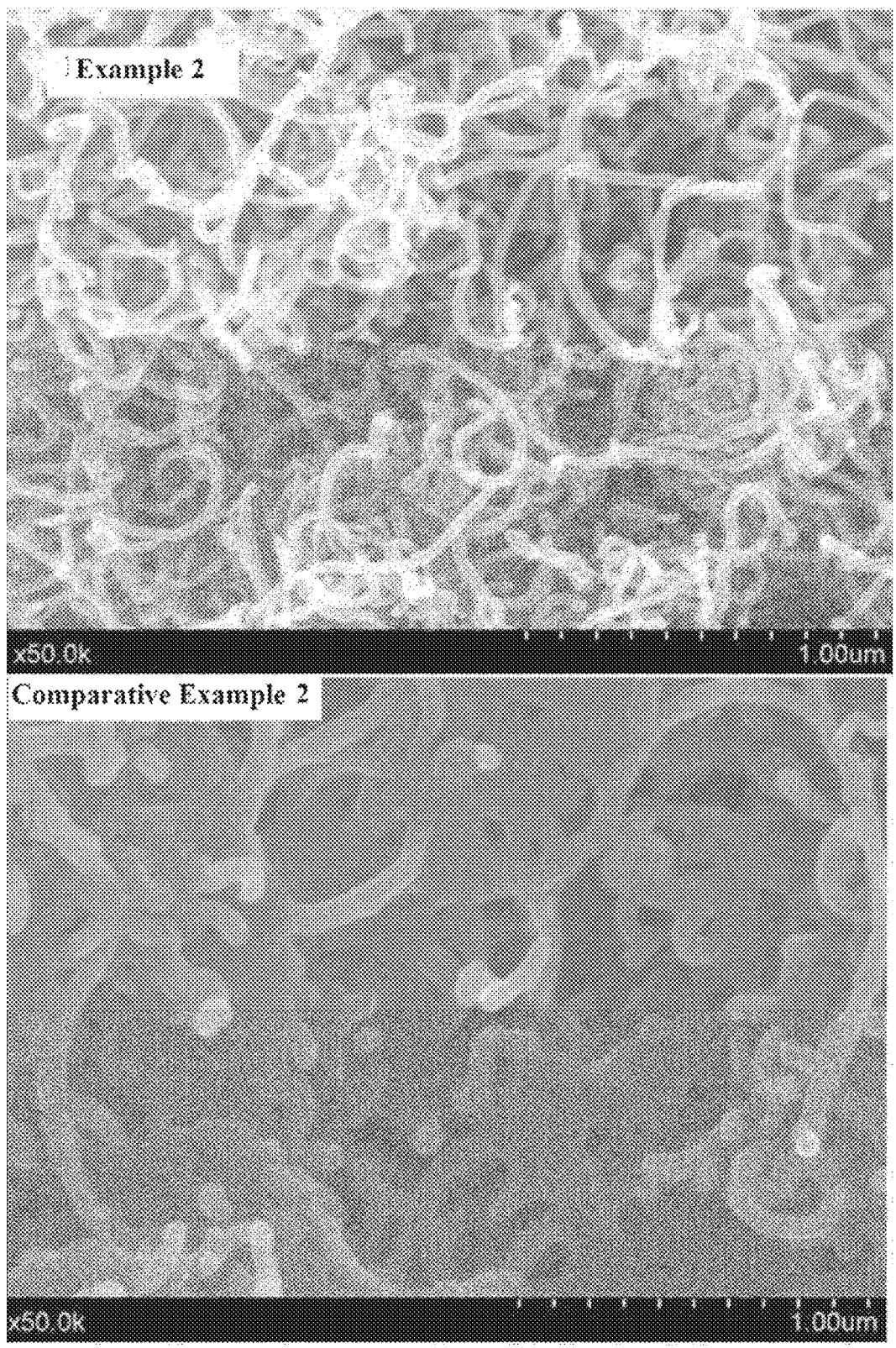

【Figure 6】
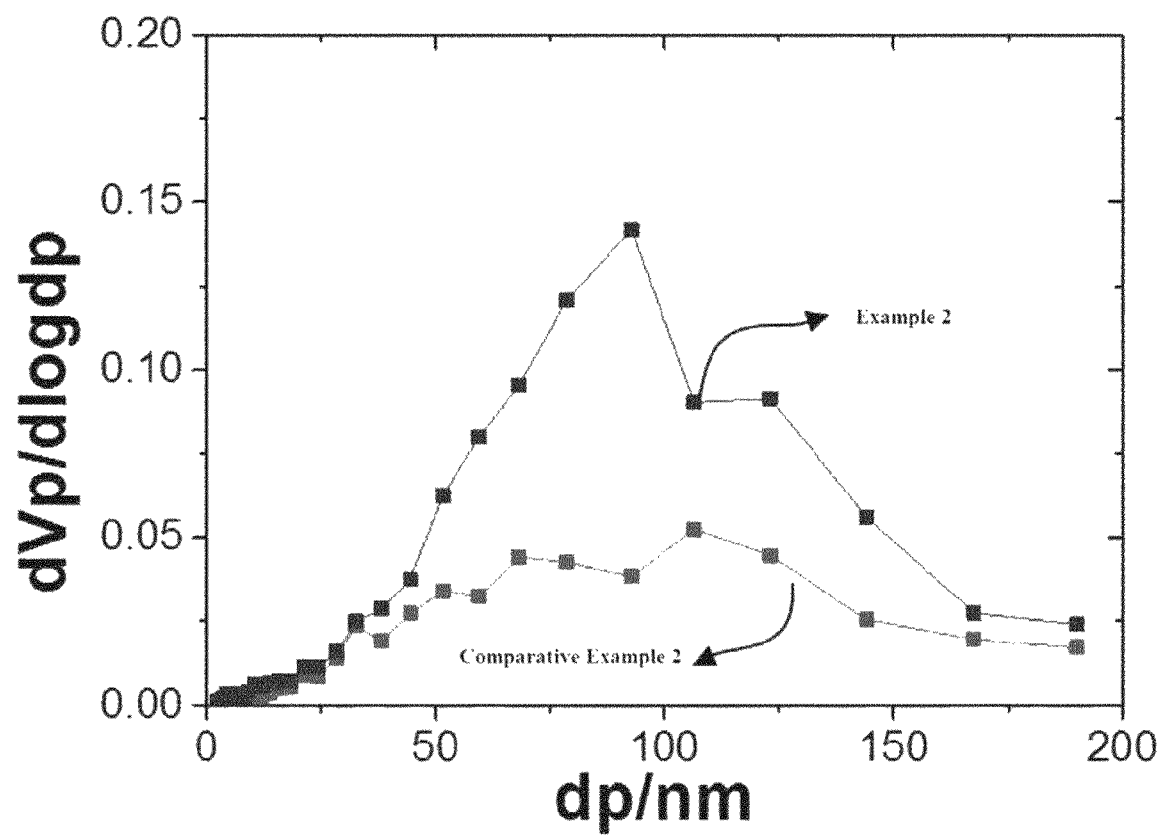

[Figure 7]
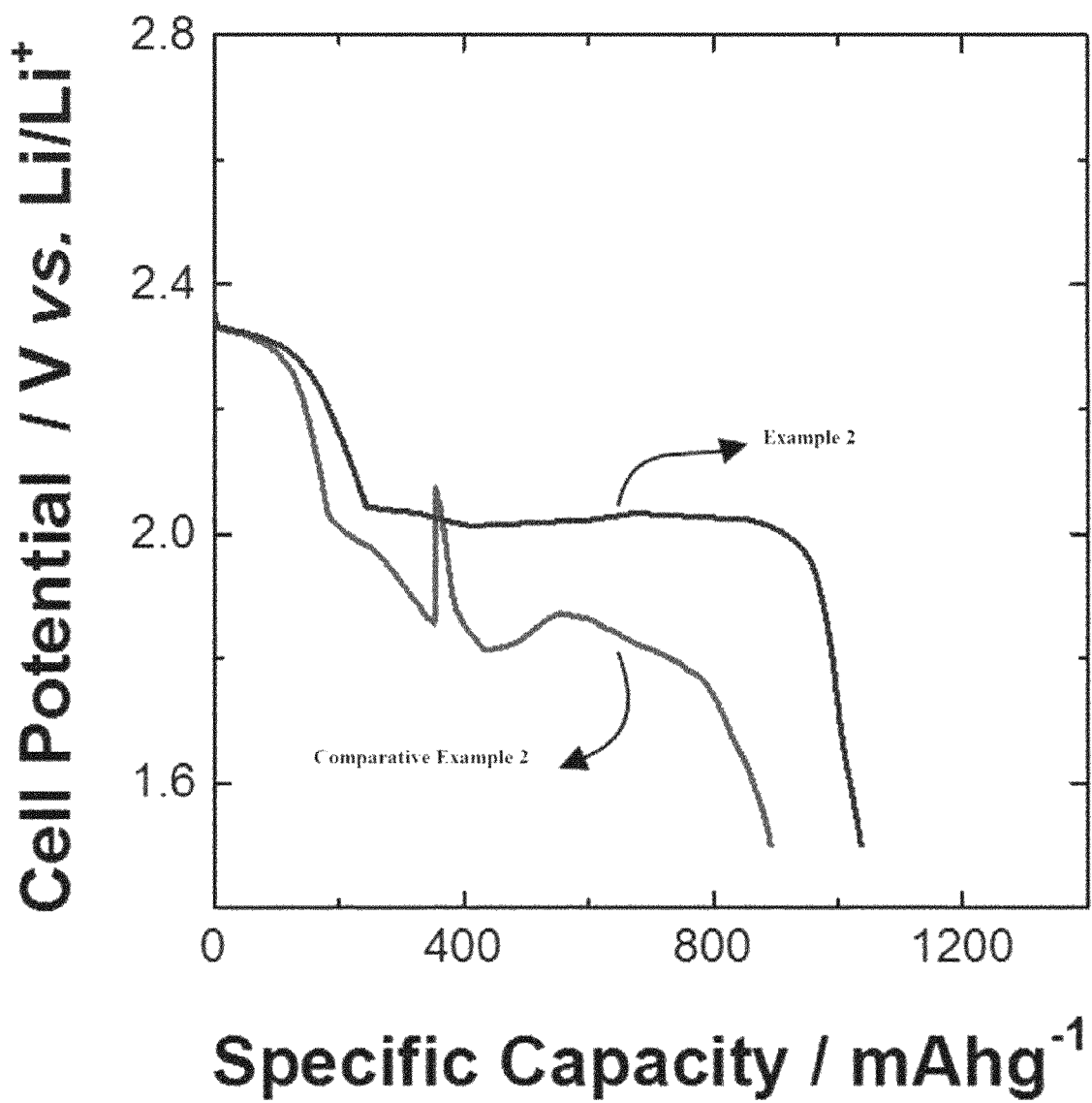

[Figure 8]
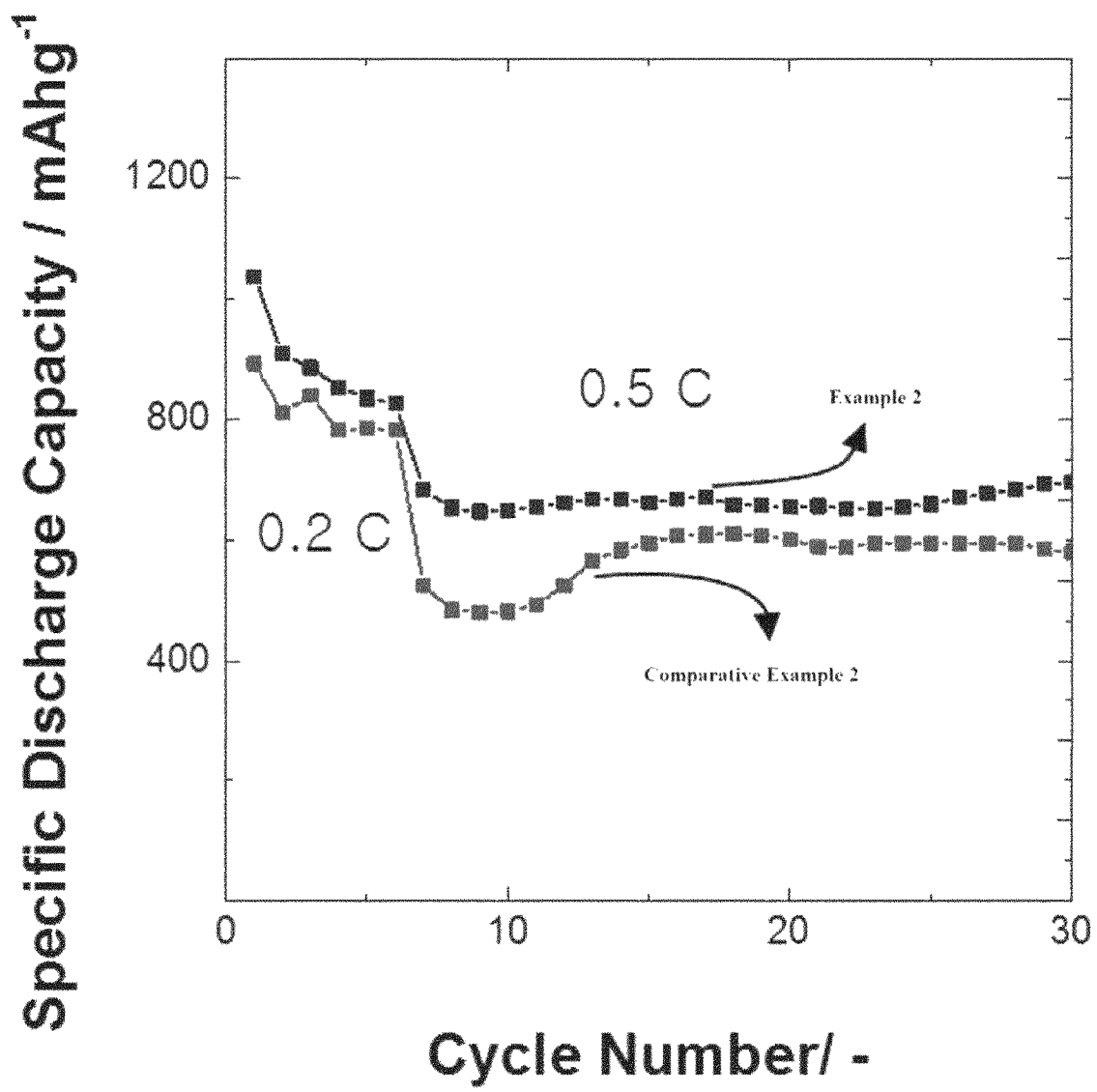

SULFUR-CARBON COMPOSITE, PREPARATION METHOD THEREFOR, AND LITHIUM SECONDARY BATTERY COMPRISING SAME

CROSS-REFERENCE TO RELATED APPLICATIONS

This application is a Continuation of U.S. application Ser. No. 16/646,490, filed on Mar. 11, 2020, which is the U.S. National Stage entry of PCT International Application No. PCT/KR2018/014070, filed on Nov. 16, 2018, which claims the benefit under 35 U.S.C. § 119(a) to Korean Patent Application No. 10-2017-0153249, filed on Nov. 16, 2017, Korean Patent Application No. 10-2018-0022217, filed on Feb. 23, 2018, and Korean Patent Application No. 10-2018-0140659, filed on Nov. 15, 2018, the entire contents of which are incorporated herein by reference.

The present invention relates to a sulfur-carbon composite, a method for preparing the same and a lithium secondary battery comprising the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution.

In particular, the lithium-sulfur (Li—S) battery is a secondary battery using a sulfur-based material having an S—S bond (sulfur-sulfur bond) as a positive electrode active material and using lithium metal as a negative electrode active material. The lithium-sulfur battery has advantages in that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (anode) and a reduction reaction of sulfur occurs at the positive electrode (cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic S$_8$ structure to the linear lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharge behavior of the lithium-sulfur battery is characterized by a step-wise discharge voltage unlike lithium ion battery.

This lithium sulfur battery has problems that the capacity is less than the theoretical value and the cycle life is short, due to the insulation property of sulfur, which is a positive electrode active material, and the lithium sulfide (Li2S), which is a product during the discharging, and the leaching property of the polysulfide, which is an intermediate product during the charging/discharging. Therefore, in order to improve the performance of the lithium sulfur battery, various studies have been conducted to improve the reactivity and cycle stability of the sulfur-positive electrode.

A sulfur/carbon composite, which is a positive electrode active material for lithium sulfur battery, greatly affects the reactivity and cycle stability of positive electrode depending on its shape, structure, specific surface area, pore volume. As the contact area of sulfur and carbon is maximized and the specific surface area and pore volume are increased, the electric conductivity and lithium ion conductivity are ensured, and thus, the high-performance operation of the lithium-sulfur battery can be expected.

Therefore, it is necessary to develop a preparing process of a sulfur/carbon composite which satisfies the above conditions and is inexpensive and mass-producible.

In this regard, the conventional preparing process of sulfur/carbon composite involves a dry mixing of sulfur and carbon powder followed by a liquid phase impregnation of sulfur through heating. In this case, the particle size of each of sulfur and carbon powder is in the order of several ten to several hundred micrometers, and the sulfur/carbon is unevenly distributed through simple mixing and heating, and the specific surface area and pore volume are low, and accordingly, there is room for improvement concerning these properties.

(Patent Document 1) Korean Patent Laid-open Publication No. 2015-0043407, "COMPOSITE MATERIALS FOR LITHIUM-SULFUR BATTERIES."

DISCLOSURE

Technical Problem

The inventors of the present invention have conducted various studies, and as a result, have confirmed the fact that if sulfur pulverized to a nanometer size is mixed with carbon and then sulfur is impregnated in liquid phase by microwave, sulfur/carbon is uniformly distributed throughout the composite and sulfur is evenly coated on the surface of the carbon to a thin thickness, thereby completing the present invention.

Therefore, it is an object of the present invention to provide a sulfur-carbon composite which exhibits, when being used as an electrode, improved initial discharging capacity and high rate capacity, as compared to existing composites, by impregnating sulfur in liquid phase using microwaves and thus evenly coating sulfur on the surface of the carbon to a thin thickness, and a method of preparing the same.

Technical Solution

In order to achieve the above object, the present invention provides a sulfur-carbon composite comprising a porous carbon material; and sulfur coated on at least a portion of the inside and the surface of the porous carbon material, wherein the pore volume of the sulfur-carbon composite is 0.04 to 0.400 $cm^3/g$ and the specific surface area of the sulfur-carbon composite is 4.0 to 30 $m^2/g$.

In addition, the present invention provides a method for preparing the sulfur-carbon composite comprising the steps of,
(a) mixing a porous carbon material with sulfur having a particle diameter of 1 nm to 1 μm;
(b) drying the mixed sulfur and porous carbon material; and
(c) applying a microwave to the mixture of the dried sulfur and porous carbon material.

In addition, the present invention provides a positive electrode comprising the sulfur-carbon composite.

In addition, the present invention provides a lithium secondary battery comprising the positive electrode as described above; a negative electrode; and an electrolyte.

Advantageous Effects

According to the present invention, by impregnating sulfur in liquid phase using microwave and thus evenly coating sulfur on the surface of the carbon to a thin thickness, there are effects that the improved initial discharging capacity and the high rate capacity can be expressed, while maintaining the specific surface area of the composite and inhibiting the leaching of the lithium polysulfide.

DESCRIPTION OF DRAWINGS

FIG. 1 is a SEM photograph of the sulfur-carbon composites according to Example 1 of the present invention and Comparative Example 1.

FIG. 2 is a graph showing the results of measurement of the pore sizes of the sulfur-carbon composites according to Example 1 of the present invention and Comparative Example 1.

FIG. 3 is a graph showing the discharging capacities of the lithium secondary batteries made of the sulfur-carbon composites of Example 1 of the present invention and Comparative Example 1.

FIG. 4 is a graph showing life characteristics of the lithium secondary batteries made of the sulfur-carbon composites of Example 1 of the present invention and Comparative Example 1.

FIG. 5 is a SEM photograph of a sulfur-carbon composites according to Example 2 of the present invention and Comparative Example 2.

FIG. 6 is a graph showing the results of measurement of the pore sizes of the sulfur-carbon composites according to Example 2 of the present invention and Comparative Example 2.

FIG. 7 is a graph showing the discharging capacities of the lithium secondary batteries made of the sulfur-carbon composites of Example 2 of the present invention and Comparative Example 2.

FIG. 8 is a graph showing life characteristics of the lithium secondary batteries made of the sulfur-carbon composites of Example 2 of the present invention and Comparative Example 2.

BEST MODE

Hereinafter, the present invention will be described in detail with reference to the accompanying drawings so that those skilled in the art can easily carry out the present invention. However, the present invention can be embodied in various different forms, and is not limited thereto.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The lithium-sulfur battery uses sulfur as a positive electrode active material and lithium metal as a negative electrode active material. During the discharging of the lithium-sulfur battery, an oxidation reaction of lithium occurs at the negative electrode and a reduction reaction of sulfur occurs at the positive electrode. At this time, the reduced sulfur is converted to lithium polysulfide by binding with the lithium ions migrated from the negative electrode and finally accompanies the formation of lithium sulfide.

The lithium-sulfur battery has a much higher theoretical energy density than the conventional lithium secondary battery, and sulfur which is used as a positive electrode active material is attracting attention as a next-generation battery, due to the advantages that since sulfur is rich in resources and its price is low, the manufacturing cost of battery can be lowered.

Despite these advantages, due to the low electrical conductivity and lithium ion conduction properties of sulfur which is a positive electrode active material, it is difficult to realize all of the theoretical energy density in actual operation.

In order to improve the electrical conductivity of sulfur, a method such as formation of composites with conductive materials such as carbon and polymer, coating and the like has been used. Among the various methods, the sulfur-carbon composite is most often used as a positive electrode active material because it is effective in improving the electrical conductivity of a positive electrode, but it is still not sufficient in terms of charging/discharging capacity and efficiency. The capacity and efficiency of a lithium-sulfur battery can vary depending on the amount of lithium ions delivered to the positive electrode. Therefore, facilitating the transfer of lithium ions into the sulfur-carbon composite is important for high capacity and high efficiency of the battery.

Sulfur-Carbon Composite

Therefore, in the present invention, in order to obtain the improvement effects of reactivity between sulfur-carbon composite and electrolyte and the capacity and efficiency characteristics of the lithium secondary battery, a sulfur-carbon composite in which sulfur is evenly coated in the inside and the surface of the porous carbon material to a thin thickness is provided. The inside of the porous carbon material is meant to comprise the pores of the porous carbon material.

The sulfur-carbon composite of the present invention comprises a porous carbon material; and sulfur coated on at least a portion of the inside and the surface of the porous carbon material, wherein the pore volume of the sulfur-carbon composite may be 0.04 to 0.400 $cm^3/g$ and the specific surface area of the sulfur-carbon composite may be 4.0 to 30 $m^2/g$.

The porous carbon material of the sulfur-carbon composite of the present invention provides a skeleton to which sulfur, which is a positive electrode active material, can be uniformly and stably immobilized, and the porous carbon material complements the electrical conductivity of the sulfur so that the electrochemical reaction proceeds smoothly.

The shape of the porous carbon material is in the form of sphere, rod, needle, plate, tube, and bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon.

The porous carbon material may have a particle diameter of 100 nm to 50 μm.

The sulfur of sulfur-carbon composite of the present invention may be at least one selected from the group consisting of inorganic sulfur ($S_8$), $Li_2S_n$(n≥1), organic sulfur compound and carbon-sulfur polymer [$(C_2S_x)_n$, x=2.5 to 50, n≥2]. Preferably, inorganic sulfur ($S_8$) can be used.

In addition, sulfur is located on the surface as well as inside the pores of the porous carbon material, and at this time, sulfur may be present in an area of less than 100%, preferably 1 to 95%, more preferably 60 to 90% of the entire outer surface of the porous carbon material. When sulfur is within the above range on the surface of the porous carbon material, it can exhibit the maximum effect in terms of the electron transfer area and the wettability of the electrolyte solution. Specifically, since sulfur is impregnated thinly and evenly on the surface of the porous carbon material in the above range, the electron transfer contact area can be increased during the charging/discharging process. If sulfur is located in the 100% area of the surface of the porous carbon material, the porous carbon material is completely covered with sulfur, so that the wettability of the electrolyte solution is deteriorated and the contact property with the conductive material contained in the electrode are decreased, and thus the electrons are not transmitted and it cannot participate in the reaction.

The sulfur-carbon composite can carry sulfur in a high content due to various sizes of pores in the structure and three-dimensionally interconnected and regularly arranged pores. Therefore, although a soluble polysulfide is produced by an electrochemical reaction, if it can be located inside a sulfur-carbon composite, the structure entangled in three dimensions can be maintained to suppress the collapse of the positive electrode structure even in the case of polysulfide leaching. As a result, the lithium-sulfur battery comprising the sulfur-carbon composite has an advantage that high capacity can be realized even under high loading. The sulfur loading amount of the sulfur-carbon composite according to the present invention may be 1 to 20 $mg/cm^2$.

In the preparation of the sulfur-carbon composite of the present invention, as sulfur particles having a particle diameter of 1 nm to 1 μm are used, they can be coated with a thickness of 1 to 10 nm on the surface or in the pore of the porous carbon material.

In the sulfur-carbon composite of the present invention, the pore volume of the sulfur-carbon composite and the specific surface area of the sulfur-carbon composite can be controlled depending on the weight ratio of sulfur and the porous carbon material.

First, in the sulfur-carbon composite according to the present invention, the weight ratio of sulfur and the porous carbon material may be 7.5:2.5 to 4:6, preferably 7.5:2.5 to 6:4. If the content of sulfur is less than the above weight ratio range, as the content of the porous carbon material is increased, the amount of the binder required for preparing the slurry of the positive electrode is increased. The increase in the amount of the added binder may increase the sheet resistance of the electrode and may act as an insulator to block the electron pass, thereby degrading the cell performance. On the contrary, if the content of sulfur exceeds the above weight ratio range, since sulfur is agglomerated with each other and difficult to receive electron, sulfur may be difficult to participate directly in the reaction of the electrode, and in particular, it does not satisfy the pore volume, specific surface area and average pore size described later.

Generally, the porous carbon material can be prepared by carbonizing precursors of various carbon materials and the porous carbon material has pores having an average diameter in the range of about 100 nm to 50 μm.

However, the sulfur-carbon composite of the present invention is coated with sulfur on a part of the inner and outer surfaces of the porous carbon material. Specifically, since the sulfur is coated inside the pores of the porous carbon material, the size of the pores of the porous carbon material is changed.

In the case of the sulfur-carbon composite prepared by the conventional method, since the size of the sulfur particles used in the preparation is as large as several tens of micrometers, even if these sulfur particles are intend to be coated in the pores of the porous carbon material, there was a problem that the sulfur particles cannot easily enter into the pores of the porous carbon material and rather, the sulfur particles obstruct the openings of the pores. Therefore, there was a problem that the specific surface area, pore size and pore volume of the sulfur-carbon composite are rather reduced when measured.

However, in the case of preparing a sulfur-carbon composite by the preparation method of the present invention, sulfur having a particle size of less than 1 micrometer can be used to thinly and evenly coat with sulfur inside the pores of the porous carbon material. In addition, by applying microwaves to the mixture of sulfur and the porous carbon material, it is possible to remove the sulfur particles blocking the openings of the pores, and to enter the inside of the pores to thinly and evenly coat the inside of the pores.

Accordingly, in the sulfur-carbon composite of the present invention, as the sulfur is thinly and evenly coated inside the pores of the porous carbon material, the pore volume of the sulfur-carbon composite may be 0.250 to 0.400 cm$^3$/g, preferably 0.300 to 0.350 cm$^3$/g.

In addition, as the sulfur is coated thinly and evenly inside the pores of the porous carbon material, the specific surface area of the sulfur-carbon composite may be 18.5 to 30 m$^2$/g, preferably 19.5 to 30 m$^2$/g.

In addition, as the sulfur is coated thinly and evenly inside the pores of the porous carbon material, the average pore size of the sulfur-carbon composite may be 55 to 100 nm.

Also, in the sulfur-carbon composite according to the present invention, the weight ratio of sulfur and the porous carbon material may be 7.5:2.5 to 9:1, preferably 7.5:2.5 to 8.5:1.5. If the content of sulfur is less than the above weight ratio range, as the content of the porous carbon material is increased, the amount of the binder required for preparing the slurry of the positive electrode is increased. The increase in the amount of the added binder may increase the sheet resistance of the electrode and may act as an insulator to block the electron pass, thereby degrading the cell performance. On the contrary, if the content of sulfur exceeds the above weight ratio range, since sulfur is agglomerated with each other and difficult to receive electron, sulfur may be difficult to participate directly in the reaction of the electrode, and in particular, it does not satisfy the pore volume, specific surface area and average pore size described later.

However, in the case of preparing a sulfur-carbon composite by the preparation method of the present invention, sulfur having a particle size of less than 1 micrometer can be used to thinly and evenly coat with sulfur inside the pores of the porous carbon material. In addition, by applying microwaves to the mixture of sulfur and the porous carbon material, it is possible to remove the sulfur particles blocking the openings of the pores, and to enter the inside of the pores to thinly and evenly coat the inside of the pores.

Accordingly, in the sulfur-carbon composite of the present invention, as the sulfur is thinly and evenly coated inside the pores of the porous carbon material, the pore volume of the sulfur-carbon composite may be 0.04 to 0.20 cm$^3$/g, preferably 0.05 to 0.15 cm$^3$/g.

In addition, as the sulfur is coated thinly and evenly inside the pores of the porous carbon material, the specific surface area of the sulfur-carbon composite may be 4.0 to 20 m$^2$/g, preferably 4.5 to 10 m$^2$/g.

In addition, as the sulfur is coated thinly and evenly inside the pores of the porous carbon material, the average pore size of the sulfur-carbon composite may be 40 to 100 nm.

When the sulfur-carbon composite of the present invention satisfies the above ranges of the pore volume, the specific surface area and the average pore size, sulfur is coated thinly and evenly inside the pores of the porous carbon material, and thus when being applied to the electrode, the battery has excellent discharging capacity and life characteristics. If the above ranges are not satisfied, since the sulfur is hardly coated in the pores or the sulfur blocks the openings of the pores, and thus when being used as an electrode, it does not satisfy the discharging capacity and life characteristics required by the user.

Method for Preparing Sulfur-Carbon Composite

The sulfur-carbon composite of the present invention is prepared through the steps of (a) mixing a porous carbon material with sulfur having a particle diameter of 1 nm to 1 μm; (b) drying the mixed sulfur and porous carbon material; and (c) applying a microwave to the mixture of the dried sulfur and porous carbon material.

First, the method for producing the sulfur-carbon composite of the present invention comprises step (a) of mixing a porous carbon material with sulfur having a particle diameter of 1 nm to 1 μm.

In step (a), when sulfur and the porous carbon material are mixed, the weight ratio of sulfur and the porous carbon material may be 7.5:2.5 to 4:6, preferably 7.5:2.5 to 6:4. If the content of sulfur is less than the above weight ratio range, as the content of the porous carbon material is increased, the amount of the binder required for preparing the slurry of the positive electrode is increased. The increase in the amount of the added binder may increase the sheet resistance of the electrode and may act as an insulator to block the electron pass, thereby degrading the cell performance. On the contrary, if the content of sulfur exceeds the above weight ratio range, since sulfur is agglomerated with each other and difficult to receive electron, sulfur may be difficult to participate directly in the reaction of the electrode, and in particular, it does not satisfy the pore volume, specific surface area and average pore size described later.

Also, in step (a), when sulfur and the porous carbon material are mixed, the weight ratio of sulfur and the porous carbon material may be 7.5:2.5 to 9:1, preferably 7.5:2.5 to 8.5:1.5. If the content of sulfur is less than the above weight ratio range, as the content of the porous carbon material is increased, the amount of the binder required for preparing the slurry of the positive electrode is increased. The increase in the amount of the added binder may increase the sheet resistance of the electrode and may act as an insulator to block the electron pass, thereby degrading the cell performance. On the contrary, if the content of sulfur exceeds the above weight ratio range, since sulfur is agglomerated with each other and difficult to receive electron, sulfur may be difficult to participate directly in the reaction of the electrode, and in particular, it does not satisfy the pore volume, specific surface area and average pore size described later.

The sulfur used in step (a) is sulfur having a particle diameter of 1 nm to 1 μm, and other features are the same as those described above. The characteristics of the porous carbon material are also the same as those described above.

Next, the method for producing a sulfur-carbon composite of the present invention comprises step (b) of drying the mixed sulfur and porous carbon material.

The drying method may be carried out in an oven at 60 to 100° C. for 12 to 36 hours, and may comprise a process of removing the solvent and the balls for the ball mill used for the mixing in step (a), and the like before drying.

Next, the method for producing the sulfur-carbon composite of the present invention comprises step (c) of applying a microwave to the mixture of the dried sulfur and porous carbon material.

The application of the microwave in step (c) may be performed at an output of 500 to 2000 W, and the application of the microwave may be performed 2 to 10 times for 2 to 10 seconds, respectively.

The method of preparing the sulfur-carbon composite according to the present invention can remove the sulfur particles blocking the openings of the pores of the porous carbon material in the sulfur-carbon composite through the application of microwaves as described above, so that sulfur can be coated thinly and uniformly as a whole.

In the sulfur-carbon composites prepared with a weight ratio of sulfur to the porous carbon material ranging from 7.5:2.5 to 4:6, preferably from 7.5:2.5 to 6:4 when mixing sulfur and the porous carbon material in step (a), as sulfur is coated thinly and evenly inside the pores of the porous carbon material, the pore volume of the sulfur-carbon composite may be 0.250 to 0.400 cm$^3$/g, preferably 0.300 to 0.350 cm$^3$/g.

In addition, as the sulfur is coated thinly and evenly inside the pores of the porous carbon material, the specific surface area of the sulfur-carbon composite may be 18.5 to 30 m$^2$/g, preferably 19.5 to 30 m$^2$/g.

In addition, as the sulfur is coated thinly and evenly inside the pores of the porous carbon material, the average pore size of the sulfur-carbon composite may be 55 to 100 nm.

In the sulfur-carbon composites prepared with a weight ratio of sulfur to the porous carbon material ranging from 7.5:2.5 to 9:1, preferably from 7.5:2.5 to 8.5:1.5 when mixing sulfur and the porous carbon material in step (a), as sulfur is coated thinly and evenly inside the pores of the porous carbon material, the pore volume of the sulfur-carbon composite may be 0.04 to 0.20 cm$^3$/g, preferably 0.05 to 0.15 cm$^3$/g.

In addition, as the sulfur is coated thinly and evenly inside the pores of the porous carbon material, the specific surface area of the sulfur-carbon composite may be 4.0 to 20 m$^2$/g, preferably 4.5 to 10 m$^2$/g.

In addition, as the sulfur is coated thinly and evenly inside the pores of the porous carbon material, the average pore size of the sulfur-carbon composite may be 40 to 100 nm.

Positive Electrode

The sulfur-carbon composite proposed in the present invention can be preferably used as a positive electrode active material of a lithium secondary battery, in particular, a lithium-sulfur battery.

The positive electrode is formed by applying and drying a composition for forming a positive electrode active material layer on the positive electrode current collector.

Specifically, a conductive material may be added to the positive electrode composition to impart additional conductivity to the prepared positive sulfur-carbon composite. The conductive material plays a role in allowing electrons to move smoothly within the positive electrode, and is not particularly limited as long as it is excellent in conductivity and can provide a large surface area without causing chemical change in the battery, but preferably a carbon-based material is used.

The carbon-based material may be any one selected from the group consisting of graphite-based materials such as natural graphite, artificial graphite, expanded graphite and graphene, activated carbon-based material, carbon black-based materials such as channel black, furnace black, thermal black, contact black, lamp black and acetylene black; carbon fiber-based materials, carbon nanotubes (CNT), carbon nanostructures such as fullerene, and mixtures thereof.

In addition to the carbon-based materials, metallic fibers such as metal mesh; metallic powder such as copper (Cu), silver (Ag), nickel (Ni) and aluminum (Al); or organic conductive materials such as polyphenylene derivatives can also be used depending on the purpose. The conductive materials may be used alone or in combination.

Also, in order to provide the positive electrode active material with an adhesion to the current collector, the positive electrode composition may further comprise a binder. The binder should be well dissolved in the solvent, and should not only constitute the conductive network between the positive electrode active material and the conductive material, but also have a proper impregnation property into the electrolyte solution.

The binder applicable to the present invention may be any binder known in the art, and specifically may be, but is not limited to, at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders, polyester-based binders, and silane-based binders, or mixtures or copolymers of two or more thereof.

The content of the binder resin may be, but is not limited to, 0.5 to 30 wt. % based on the total weight of the positive electrode for the lithium-secondary battery. If the content of the binder resin is less than 0.5 wt. %, the physical properties of the positive electrode may be deteriorated and thus positive electrode active material and the conductive material can be broken away. If the content exceeds 30 wt. %, the ratio of the active material and the conductive material in the positive electrode is relatively reduced, and the battery capacity can be reduced.

A solvent for preparing a positive electrode composition for a lithium-sulfur battery in a slurry state should be easy to dry and should dissolve the binder well, and most preferably, the solvent is a solvent which capable of keeping the positive electrode active material and the conductive material in a dispersed state without dissolving them. If the solvent dissolves the positive electrode active material, since the specific gravity (D=2.07) of sulfur in the slurry is high, sulfur is submerged in the slurry and thus sulfur is concentrated in the collector during the coating process and there is a tendency that problems occur in the conductive network, thereby occurring problems in the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The positive electrode composition may be mixed by stirring by a conventional method using conventional mixers such as a latex mixer, a high-speed shear mixer, a homo-mixer, or the like.

The positive electrode composition may be applied to the current collector and dried in a vacuum to form a positive electrode for the lithium-sulfur battery. The slurry can be coated on the current collector with an appropriate thickness according to the viscosity of the slurry and the thickness of the positive electrode to be formed, and can be appropriately selected within a range of preferably 10 to 300 μm.

In this case, there is no limitation on the method of coating the slurry, and the method of coating the slurry may comprise, for example, a doctor blade coating, a dip coating, a gravure coating, a slit die coating, a spin coating, a comma coating, a bar coating, a reverse roll coating, a screen coating, a cap coating method and the like.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used, and preferably an aluminum current collector can be used. The positive electrode current collector may be formed in various forms such as film, sheet, foil, net, porous body, foam or nonwoven fabric.

Lithium Secondary Battery

As one embodiment of the present invention, the lithium secondary battery may comprise the positive electrode as described above; a negative electrode comprising lithium metal or lithium alloy as a negative electrode active material; a separator interposed between the positive electrode and the negative electrode; and an electrolyte which is impregnated to the negative electrode, the positive electrode and the separator and comprises a lithium salt and an organic solvent. In addition, the lithium secondary battery may be a lithium-sulfur battery comprising a sulfur compound in the positive electrode active material in the positive electrode.

The negative electrode may comprise a material capable of reversibly intercalating or deintercalating lithium ion ($Li^+$), a material capable of reversibly forming lithium containing compounds by reacting with lithium ion, or lithium metal or lithium alloy, as the negative electrode active material. The material capable of reversibly intercalating or deintercalating lithium ion can be, for example, crystalline carbon, amorphous carbon, or a mixture thereof. The material capable of reacting with lithium ion to reversibly form lithium containing compounds may be, for example, tin oxide, titanium nitrate or silicon. The lithium alloy may be, for example, an alloy of lithium and a metal selected from the group consisting of Na, K, Rb, Cs, Fr, Be, Mg, Ca, Sr, Ba, Ra, Al and Sn.

Also, in the process of charging/discharging lithium-sulfur battery, sulfur used as a positive electrode active material can be changed to an inactive material and then attached to the surface of the lithium negative electrode. As mentioned above, the inactive sulfur means sulfur which is no longer able to participate in the electrochemical reaction of the positive electrode through various electrochemical or chemical reaction. The inactive sulfur formed on the surface of the lithium negative electrode also has the advantage of acting as a protective layer of the lithium negative electrode. Therefore, the lithium metal and the inactive sulfur formed on the lithium metal, such as lithium sulfide, may be used as a negative electrode.

The negative electrode of the present invention may further comprise a pretreatment layer made of a lithium ion conductive material, and a lithium metal protective layer formed on the pretreatment layer, in addition to the negative electrode active material.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, and may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 µm and a thickness of 5 to 300 µm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the form of solid may comprise less than about 20% by weight of non-aqueous organic solvent. In this case, an appropriate gelling agent may be comprised to reduce the fluidity of the organic solvent. Representative examples of such gelling agent may comprise polyethylene oxide, polyvinylidene fluoride, and polyacrylonitrile, etc.

The electrolyte impregnated to the negative electrode, the positive electrode, and the separator is composed of a lithium salt and an electrolyte solution as a non-aqueous electrolyte containing a lithium salt. Non-aqueous organic solvent, organic solid electrolyte, and inorganic solid electrolyte, etc., are used as the electrolyte solution.

The lithium salt of the present invention is a substance which can be easily dissolved in a non-aqueous organic solvent, and for example, may comprise at least one selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, lithium chloroborane, lithium lower aliphatic carboxylate, lithium tetraphenyl borate, lithium imide, and mixtures thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion ($Li^+$) may be reduced.

The non-aqueous organic solvent should dissolve the lithium salt well, and the non-aqueous organic solvent of the present invention may comprise, for example, aprotic organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charge/discharge characteristics, flame retardancy, and the like. In some cases, a halogen-containing solvent such as carbon tetrachloride, ethylene trifluoride or the like can be also added for the purpose of imparting nonflammability, and a carbon dioxide gas can be further comprised for the purpose of improving preservation characteristics at a high temperature, and FEC (fluoro-ethylene carbonate), PRS (propene sultone), FPC (fluoro-propylene carbonate) and the like can be further comprised.

The electrolyte may be a liquid electrolyte and also an electrolyte separator form in a solid state. When using the liquid electrolyte, a separator made of porous glass, plastic, ceramic, or polymer is further comprised as a physical separator having a function of physically separating the electrodes.

Hereinafter, preferred examples will be presented to facilitate understanding of the present invention. However, it will be apparent to those skilled in the art that the following examples are illustrative of the present invention and that various changes and modifications can be made within the scope and spirit of the present invention, and that such variations and modifications are within the scope of the appended claims

EXAMPLES

Preparation of Sulfur-Carbon Composite

Example 1

To a 125 mL container, 200 g of $ZrO_2$ balls having a diameter of 5 mm, 7.8 g of sulfur, and 30 g of ethanol were placed and ball-milled at 200 rpm for 3 days to be crushed into nano-sized sulfur particles. Thereafter, 3 g of carbon nanotubes were added to the container containing the pulverized sulfur particles, $ZrO_2$ balls and ethanol, and ball-milled at 200 rpm for 3 hours to mix sulfur and carbon. The mixture of sulfur and carbon was filtered to remove ethanol and $ZrO_2$ balls, followed by drying in an oven at 80° C. for 24 hours. Thereafter, to the dried mixture of sulfur and carbon, 1000 W microwave (BP-110, Microwave Research and Applications) was applied three times for 3 seconds respectively to prepare a sulfur-carbon composite.

Example 2

To a 125 mL container, 200 g of $ZrO_2$ balls (RETSCH) having a diameter of 5 mm, 8.9 g of sulfur, and 30 g of ethanol were placed and ball-milled at 200 rpm for 3 days to be crushed into nano-sized sulfur particles. Thereafter, 2 g of carbon nanotubes were added to the container containing the pulverized sulfur particles, $ZrO_2$ balls and ethanol, and ball-milled at 200 rpm for 3 hours to mix sulfur and carbon. The mixture of sulfur and carbon was filtered to remove ethanol and $ZrO_2$ balls, followed by drying in an oven at 80° C. for 24 hours. Thereafter, to the dried mixture of sulfur and carbon, 1000 W microwave (BP-110, Microwave Research and Applications) was applied three times for 3 seconds respectively to prepare a sulfur-carbon composite.

Comparative Example 1

To a 1 L container, 270 g of $ZrO_2$ balls having a diameter of 5 mm, 23.4 g of sulfur, and 7 g of carbon nanotubes were placed and ball-milled at 200 rpm for 3 hours to mix sulfur and carbon. Thereafter, the mixture was heated in an oven at 155° C. for 30 minutes to prepare a sulfur-carbon composite.

Comparative Example 2

To a 1 L container, 270 g of $ZrO_2$ balls having a diameter of 5 mm, 26.7 g of sulfur, and 6 g of carbon nanotubes were placed and ball-milled at 200 rpm for 3 hours to mix sulfur and carbon. Thereafter, the mixture was heated in an oven at 155° C. for 30 minutes to prepare a sulfur-carbon composite.

Experimental Example 1: Evaluation of Physical Properties of Composite (Results of SEM Analysis)

The sulfur-carbon composites prepared in Example 1 and Comparative Example 1 were photographed with a scanning electron microscope (SEM, 5-4800, HITACHI), and the results are shown in FIG. 1.

As shown in FIG. 1, it was confirmed that in the case of the sulfur-carbon composites of Examples 1 and 2, sulfur is thinly and evenly coated on the surface of the carbon nanotubes to a few nm levels, and in contrast, in the case of the sulfur-carbon composites of Comparative Examples 1 and 2, sulfur is coated on the surface of the carbon nanotubes to a thickness of 30 to 40 nm or more.

In addition, the sulfur-carbon composites prepared in Example 2 and Comparative Example 2 were photographed with a scanning electron microscope (SEM, 5-4800, HITACHI), and the results are shown in FIG. 5.

As shown in FIG. 5, it was confirmed that in the case of the sulfur-carbon composite of Example 2, sulfur is thinly and evenly coated on the surface of the carbon nanotubes to a few nm levels, and in contrast, in the case of the sulfur-carbon composite of Comparative Example 2, sulfur is coated on the surface of the carbon nanotubes to a thickness of 30 to 40 nm or more.

(Comparison of Pore Structure)

The pore size, the specific surface area and the pore volume of the sulfur-carbon composites prepared in Examples 1 and 2 and Comparative Examples 1 and 2 were measured using a nitrogen adsorption equipment (BELSorp, BEL), and the results are shown in tables 1 and 2 and FIGS. 2 and 6.

TABLE 1

| | Specific surface area (m²/g) | Pore volume (cm³/g) | Average pore (nm) |
|---|---|---|---|
| Comparative Example1 | 18.01 | 0.235 | 52.3 |
| Example1 | 19.71 | 0.310 | 62.8 |

TABLE 2

| | Specific surface area (m²/g) | Pore volume (cm³/g) | Average pore (nm) |
|---|---|---|---|
| Example2 | 5.73 | 0.063 | 43.7 |
| Comparative Example2 | 3.46 | 0.030 | 34.9 |

Through the translation of table 1 and FIG. 2, it was confirmed that the specific surface area, the pore volume, and the average pore of the sulfur-carbon composite prepared in Example 1 were all increased.

Through the translation of table 2 and FIG. 6, it was confirmed that the specific surface area, the pore volume, and the average pore of the sulfur-carbon composite prepared in Example 2 were all increased.

Experimental Example 2: Evaluation of Physical Properties of Battery (Manufacture of Battery)

The sulfur-carbon composites prepared in Examples 1 to 2 and Comparative Examples 1 and 2, binder (LiPAA/PVA mixed at 6.5:0.5) and conductive material (VGCF) were mixed at a weight ratio of 88:7:5 of the sulfur-carbon composite binder:conductive material to prepare a slurry, and then the slurry thus prepared was coated on the collector of aluminum foil having a thickness of 20 μm to prepare an electrode.

The prepared electrode was used as a positive electrode and lithium metal was used as a negative electrode to prepare a coin cell. In this case, as an electrolyte solution of the coin cell, an electrolyte solution prepared from 2-Me-THF/DOL/DME(1:1:1), 1M LiN(CF$_3$SO$_2$)$_2$(LiTFSI), 0.1M LiNO$_3$ was used. As the solvent of the 2-Me-THF/DOL/DME, 2-methyl tetrahydrofuran, dioxolane, and dimethyl ether were used, respectively.

The capacity of the manufactured coin cell was measured from 1.5 to 2.8 V, and the results are shown in FIGS. 3 and 7 and in tables 3 and 4.

TABLE 3

| Example | Discharging capacity [mAh/g] |
| --- | --- |
| Example 1 | 1,209 |
| Comparative Example 1 | 1,144 |

TABLE 4

| Example | Discharging capacity [mAh/g] |
| --- | --- |
| Example 2 | 1,037 |
| Comparative Example 2 | 892 |

As shown in FIG. 3 and table 3, it was confirmed that for Comparative Example 1 and Example 1, which have the same sulfur:carbon ratio, the initial discharging capacity of Example 1 is improved. Also, for the manufactured coin cell, 2.5 cycles of charging at 0.1C rate CC and discharging at 0.1C rate CC, followed by 3 cycles of 0.2C charging/0.2C discharging and then 30 cycles of 0.3C charging/0.5C discharging were repeated to measure the charging/discharging efficiency (CC: Constant Current).

The results are shown in FIG. 4, and it was confirmed that the life characteristics of Example 1 are improved as compared to Comparative Example 1.

Also, as shown in FIG. 7 and table 4, it can be seen that for Comparative Example 2 and Example 2, which have the same sulfur:carbon ratio, the initial discharging capacity of Example 2 is improved.

Also, for the manufactured coin cell, 2.5 cycles of charging at 0.1C rate CC and discharging at 0.1C rate CC, followed by 3 cycles of 0.2C charging/0.2C discharging and then 30 cycles of 0.3C charging/0.5C discharging were repeated to measure the charging/discharging efficiency (CC: Constant Current).

The results are shown in FIG. 8, and it was confirmed that the life characteristics of Example 2 are improved as compared to Comparative Example 2.

The invention claimed is:

1. A sulfur-carbon composite comprising:
   a porous carbon material; and
   sulfur coated on at least a portion of an inside and a surface of the porous carbon material,
   wherein a pore volume of the sulfur-carbon composite is 0.04 cm$^3$/g to 0.400 cm$^3$/g and a specific surface area of the sulfur-carbon composite is 4.0 m$^2$/g to 30 m$^2$/g,
   wherein the sulfur and the porous carbon material are present in the sulfur-carbon composite in a weight ratio of 7.5:2.5 to 4:6, and
   wherein a pore size of the sulfur-carbon composite ranges from 55 nm to 100 nm.

2. The sulfur-carbon composite according to claim 1, wherein the pore volume of the sulfur-carbon composite is 0.300 cm$^3$/g to 0.350 cm$^3$/g, and the specific surface area of the sulfur-carbon composite is 19.5 m$^2$/g to 30 m$^2$/g.

3. The sulfur-carbon composite according to claim 1, wherein the pore volume of the sulfur-carbon composite is 0.04 cm$^3$/g to 0.20 cm$^3$/g and the specific surface area of the sulfur-carbon composite is 4.0 m$^2$/g to 20 m$^2$/g.

4. The sulfur-carbon composite according to claim 1, wherein the pore volume of the sulfur-carbon composite is 0.05 cm$^3$/g to 0.15 cm$^3$/g, and the specific surface area of the sulfur-carbon composite is 4.5 m$^2$/g to 10 m$^2$/g.

5. The sulfur-carbon composite according to claim 1, wherein the sulfur is coated to a thickness of 1 nm to 10 nm.

6. The sulfur-carbon composite according to claim 1, wherein the porous carbon material is in a form of a particle and has a particle diameter of 100 nm to 50 μm.

7. The sulfur-carbon composite according to claim 1, wherein the porous carbon material comprises at least one selected from the group consisting of graphite, graphene, carbon black, carbon nanotube, carbon fiber and activated carbon.

8. A positive electrode comprising the sulfur-carbon composite of claim 1.

9. A lithium secondary battery comprising
   the positive electrode of claim 8;
   a negative electrode; and
   an electrolyte.

* * * * *